(12) United States Patent
Livesey (10) Patent No.: US 9,973,818 B2
(45) Date of Patent: *May 15, 2018

(54) PRODUCT INFORMATION DISPLAY AND PURCHASING

(71) Applicant: Carl Livesey, Wigan (GB)

(72) Inventor: Carl Livesey, Wigan (GB)

(73) Assignee: VIAP LIMITED, Wigan (GB)

( * ) Notice: Subject to any disclaimer, the term of this patent is extended or adjusted under 35 U.S.C. 154(b) by 542 days.

This patent is subject to a terminal disclaimer.

(21) Appl. No.: 14/721,243

(22) Filed: May 26, 2015

(65) Prior Publication Data

US 2015/0256888 A1 Sep. 10, 2015

Related U.S. Application Data

(63) Continuation of application No. 12/101,485, filed on Apr. 11, 2008, now Pat. No. 9,071,730, which is a
(Continued)

(30) Foreign Application Priority Data

Apr. 14, 2007 (GB) .................................... 0707216.8
Nov. 16, 2007 (GB) .................................... 0722532.9

(51) Int. Cl.
```
G06Q 30/00      (2012.01)
G06F 17/30      (2006.01)
H04N 21/478     (2011.01)
H04N 7/173      (2011.01)
H04N 21/433     (2011.01)
```
(Continued)

(52) U.S. Cl.
CPC ... *H04N 21/47815* (2013.01); *H04N 7/17318* (2013.01); *H04N 21/4316* (2013.01); *H04N 21/4333* (2013.01); *H04N 21/4725* (2013.01); *H04N 21/47217* (2013.01); *H04N 21/8133* (2013.01); *H04N 21/858* (2013.01);
(Continued)

(58) Field of Classification Search
CPC ................................................ H04N 21/47815
See application file for complete search history.

(56) References Cited

U.S. PATENT DOCUMENTS

| 5,929,850 A | 7/1999 | Broadwin et al. |
| 6,169,573 B1 | 1/2001 | Sampath-Kumar et al. |

(Continued)

FOREIGN PATENT DOCUMENTS

| EP | 0982947 A2 | 1/2000 |
| WO | 0193592 A1 | 6/2001 |

OTHER PUBLICATIONS

Cole, G. (Jan. 15, 1997). Off-line computer shopping on trial. The Times Retrieved from http://search.proquest.com/docview/317734693?accountid=14753.

*Primary Examiner* — Kathleen Palavecino
(74) *Attorney, Agent, or Firm* — Barlow, Josephs & Holmes, Ltd.

(57) ABSTRACT

A method of providing additional information to a viewer of a moving image file is disclosed. The method includes the steps of providing one or more tags within the moving image file indicating the existence of additional product information; visually indicating the existence of the tags alongside or over the moving image; detecting a request to view the product information associated with the one or more tags; pausing the moving image; and displaying the requested product information over the paused image.

17 Claims, 10 Drawing Sheets

Related U.S. Application Data continuation-in-part of application No. 11/944,689, filed on Nov. 26, 2007, now abandoned.

(51) Int. Cl.
*H04N 21/4725* (2011.01)
*H04N 21/431* (2011.01)
*H04N 21/472* (2011.01)
*H04N 21/81* (2011.01)
*H04N 21/8545* (2011.01)
*H04N 21/858* (2011.01)
*H04N 5/765* (2006.01)

(52) U.S. Cl.
CPC ......... *H04N 21/8545* (2013.01); *H04N 5/765* (2013.01); *H04N 21/478* (2013.01)

(56) References Cited

U.S. PATENT DOCUMENTS

| | | |
|---|---|---|
| 6,205,231 B1 | 3/2001 | Isadore-Barreca et al. |
| 6,580,870 B1 | 6/2003 | Kanazawa et al. |
| 6,615,408 B1 | 9/2003 | Kaiser et al. |
| 6,774,908 B2 | 8/2004 | Bates et al. |
| 2002/0059604 A1 | 5/2002 | Papagan et al. |
| 2003/0167465 A1 | 9/2003 | Davis et al. |
| 2005/0021903 A1 | 1/2005 | Baxter, Jr. |
| 2005/0022226 A1 | 1/2005 | Ackley et al. |
| 2005/0086690 A1 | 4/2005 | Gilfix et al. |
| 2005/0195292 A1 | 9/2005 | McIntyre et al. |
| 2005/0229227 A1 | 10/2005 | Rogers |
| 2006/0136980 A1 | 6/2006 | Fulcher et al. |
| 2006/0184960 A1 | 8/2006 | Horton et al. |
| 2007/0157251 A1 | 7/2007 | Shrivastava et al. |
| 2007/0169155 A1 | 7/2007 | Pasquale et al. |
| 2007/0260987 A1 | 11/2007 | Mohoney et al. |
| 2007/0283238 A1 | 12/2007 | Hecht et al. |
| 2008/0046956 A1 | 2/2008 | Kulas |
| 2008/0143481 A1 | 6/2008 | Abraham et al. |

PRODUCT INFORMATION DISPLAY AND PURCHASING

The present invention relates to a method and system for providing product information to viewers of a moving image file and to a method and system operable in connection therewith for the purchase of such products.

Commonly, viewers of movies, television programs or other moving image media are greatly influenced by such media. In particular, viewers may admire actors involved and clothing worn or other products utilised by those actors in the viewed media. Typically, obtaining information as to the exact identity of such products is not straightforward and may involve researching the matter in other media such as newspapers or magazines or on fans' websites. Having obtained this information as to product identity, it may then require further research to determine if a product is available for sale and locate a retail channel by which the product may be obtained.

It is therefore an object of the present invention to provide a system and method by which these problems may at least partially alleviated or overcome.

According to a first aspect of the present invention there is provided is method of providing additional information to a viewer of a moving image file comprising:

(a) providing one or more tags within the moving image file indicating the existence of additional product information;

(b) visually indicating the existence of said tags alongside or over the moving image;

(c) detecting a request to view said product information associated with said one or more tags;

(d) pausing said moving image; and (e) displaying said requested product information over said paused image.

By use of the above method, a viewer can easily tell when there is further information available relating a product and can readily access that information.

Whilst the method is set out in a particular order above, the invention may be implemented with in alternative orders if desired, required or appropriate. For instance, in some embodiments step (d), pausing the moving image, may take place before step (b), visually indicating the existence of said tags.

The visual indication of the existence of a tag may be automatic or may be in response to viewer action. The viewer action may be a selection of a tag visual indication display mode. The tag visual indication display mode may toggle between enabled and not enabled. Alternatively, the tag visual indication display mode may be enabled temporarily in response to viewer selection or request. In such cases, the mode may be enabled for a limited time period, say a few seconds, or for a duration dependent upon the image file, say until the end of a current scene. Additionally or alternatively, tag visual indication may be in response to viewer selection of a particular area of the displayed image. The area may be the area of the image wherein the associated product is displayed or may be another dedicated area of the image. The visual indication may be displayed for a limited time period, say a few seconds, or for a duration dependent upon the image file, say until the end of a current scene.

In the event that the visual indication only occurs after the image has been paused, the visual indication may occur in response to any viewer request to pause playback, any viewer request to pause playback when in a tag visual indication display mode or in response to viewer scrolling a cursor over the displayed image, in any mode or in a tag visual indication mode.

The visual indication of the existence of a tag may comprise the display of an product icon. The product icon may be displayed over the tagged product or may be displayed in an icon display area. The icon display area may be a bar provided along one edge of the display area. The product icon may comprise a representation of the associated product. The representation may be a stylised representation or may be a photographic type image.

Additionally or alternatively, the tagged product may be visually highlighted within the image. This visual highlighting may be momentary, intermittent or constant as desired. In some implementations, this highlighting may take place in response to a viewer request.

The displayed information may be displayed in a window or dialog box provided over the paused image. The displayed information may contain any of the following: a description of the qualities of the product, one or more images of the product, the name of the manufacturer and purchasing details for the product.

Viewer requests are preferably made using suitable control means. The control means may be any type of control means suitable for interfacing with the system used to play and/or display the image file. Such suitable types of control means may include control interfaces provided directly upon the system, keyboards or keypads connected to the system by any suitable wired or wireless link, cursor directing devices connected to the system by any suitable wired or wireless link or any other control unit.

The system may comprise an integrated device or one or more connected devices. Suitable systems for playing and/or displaying the image file may include computers or may include televisions and televisions operated in conjunction with a media player such as a DVD player, games console or television signal decoder or through a mobile technology device According to a second aspect of the present invention there is provided a system for providing additional information to viewers of a moving image file comprising: file reading means for reading the moving image content of said moving image file and detecting the presence of one or more tags indicating the existence of associated product information within the moving image file; display means operable to display the moving image content of the moving image file and to display a visual indication of the existence of said tags alongside or over the moving image; viewer actuable means for requesting the display of product information associated with said one or more tags wherein in response to the viewer actuable means the display means is operable to pause the moving image and display the requested information over the paused image.

The system of the second aspect of the present invention may incorporate any or all features of the first aspect of the present invention as desired or as appropriate.

According to a third aspect of the present invention there is provided an enhanced moving image file format comprising: a moving image file; one or more tags; and information associated with said tags.

The file format of the third aspect of the present invention may incorporate any or all features of the first or second aspects of the present invention as desired or as appropriate.

The file format may be based on any suitable moving image file format including MPEG and any file formats viewable in RealPlayer™, QuickTime™ or Windows Media Player™.

According to a fourth aspect of the present invention there is provided a method of facilitating product sales comprising: displaying additional information to a viewer in accordance with the first aspect of the present invention wherein the displayed information relates to a particular product or products displayed on screen and wherein the displayed information includes a selectable purchase icon, selection of which enables the connection of the viewer to an electronic commerce interface, for the purchase of said product.

The method of the fourth aspect of the present invention may incorporate any or all features of the first, second or third aspects of the present invention as desired or as appropriate.

In this manner, a viewer can readily order a product seen in to viewed image file.

The selectable purchase icon may be revealed by scrolling over one or more regions of the image. In particular the selectable purchase icon may be revealed by scrolling over a product icon in the dialog box or along the icon display area.

The purchase icon may be selected using suitable control means. The control means may be any type of control means mentioned in relation to the previous aspects of the present invention. The control means may also be used to operate the commerce interface.

Selection of the purchase icon may connect the viewer directly to said commerce interface. Alternatively, selection of the purchase icon may result in the addition of the product to a shopping list. After the product is added to the shopping list, the viewer may opt either to continue viewing the image file or to complete the purchasing process. The viewer may additionally or alternatively opt to complete the purchasing process at any time by selecting a displayed checkout icon.

The checkout icon may also be displayed in the icon display area during normal playing of the moving image file. Selection of the checkout icon may allow the viewer to review their shopping list before completing the purchase process. Additionally or alternatively, actuation of a particular control button on the control means may be equivalent to selection of the checkout icon.

The commerce interface may be any suitable commerce interface. In particular it may be an electronic commerce interface operable in response to input of viewer and product details to verify an order and subsequently pass on order details to a manufacturer or distributor enabling the order to be fulfilled. Typically, the commerce interface may be operated on a remote server.

Once connected to the commerce interface, the viewer must enter and/or confirm their billing and/or delivery details. In some implementations, it is possible that the viewer may merely confirm previously entered billing and/or delivery details. Upon confirmation from the viewer of the billing and/or delivery details, the interface is operable to verify the order. If the order is verified, a confirmation message is communicated to the viewer. The viewer may then choose to return to normal operation of the viewing system by selecting an icon or otherwise.

According to a fifth aspect of the present invention there is provided a system for facilitating product sales comprising: a system for providing additional information to viewers of a moving image file according to the second aspect of the present invention, wherein the displayed information relates to a particular product or products displayed on screen and wherein the displayed information includes a selectable purchase icon, the system further comprising: viewer operated control means for selecting said selectable purchase icon: and data transmission means operable to in response to the selection of said selectable purchase icon to enable connection of the system to an electronic commerce interface, for the purchase of said product.

The system of the fifth aspect of the present invention may incorporate any or all features of the fourth aspect of the present invention as desired or as appropriate.

In order that the invention is more clearly understood, it will be described in greater detail below, by way of example only, and with reference to the accompanying drawings in which.

The present invention provides a method by means of which a viewer of a moving image file (typically a film or computer game or television programme) may gain information upon and if desired purchase products seen in the moving image file. In the method of the invention a moving image file is displayed on a display unit and the viewer is provided with a suitable control means. The moving image file contains one or more tags indicating the existence of additional product information. The existence of said tags is displayed to the viewer along with the moving image file in response to a viewer selection, request or action. The viewer may then request the display of said information and if so minded, order the associated product.

Figure 1:
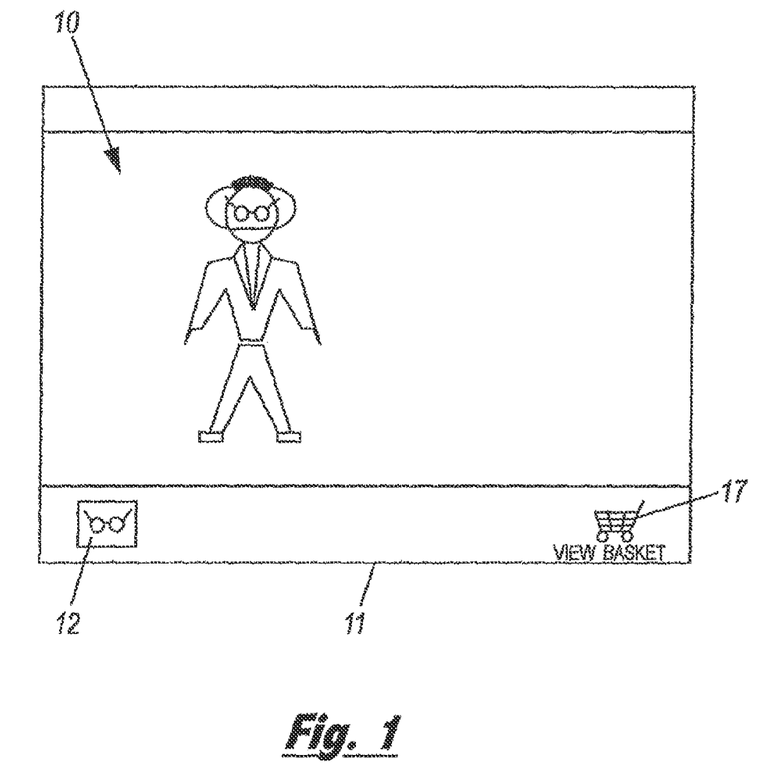
FIG. 1 shows an exemplary scene from a moving image file as it is displayed in an implementation of the present invention.

Turning now to FIG. 1, an exemplary scene 10 from a moving image file is displayed on the display device. In FIG. 1, a viewer selection of a tag visual indication display mode has been made. Accordingly, the scene 10 is displayed with an icon bar 11 at the bottom of the image. If the tag visual indication display mode is not selected, the image the is displayed in the same manner as a conventional image file. The tag visual indication display mode can be temporary or can persist until the viewer selection is reversed. The selection may be made by actuating a suitable input on the control means. If a tagged product appears within the scene, a selectable icon 12 is displayed on the icon bar. Typically, as is shown in respect of the spectacles in FIG. 1, the icon may be pictorially representative of the icon that it is associated with. This enables the viewer to identify the product and to distinguish between two or more icons if there are two or more tagged products present in the displayed scene. Additionally or alternatively, the product may be highlighted either constantly or momentarily within the moving image.

In one particular implementation, the product is highlighted when the viewer scrolls a cursor over the area of the image where the product is positioned.

The icon 12 may be selected by use of the control means. This may be achieved by actuating a dedicated control input. Alternatively, if the control device is suitable (for instance, a computer mouse or similar), the viewer may directly select the product by scrolling a cursor over the product.

Figure 2:
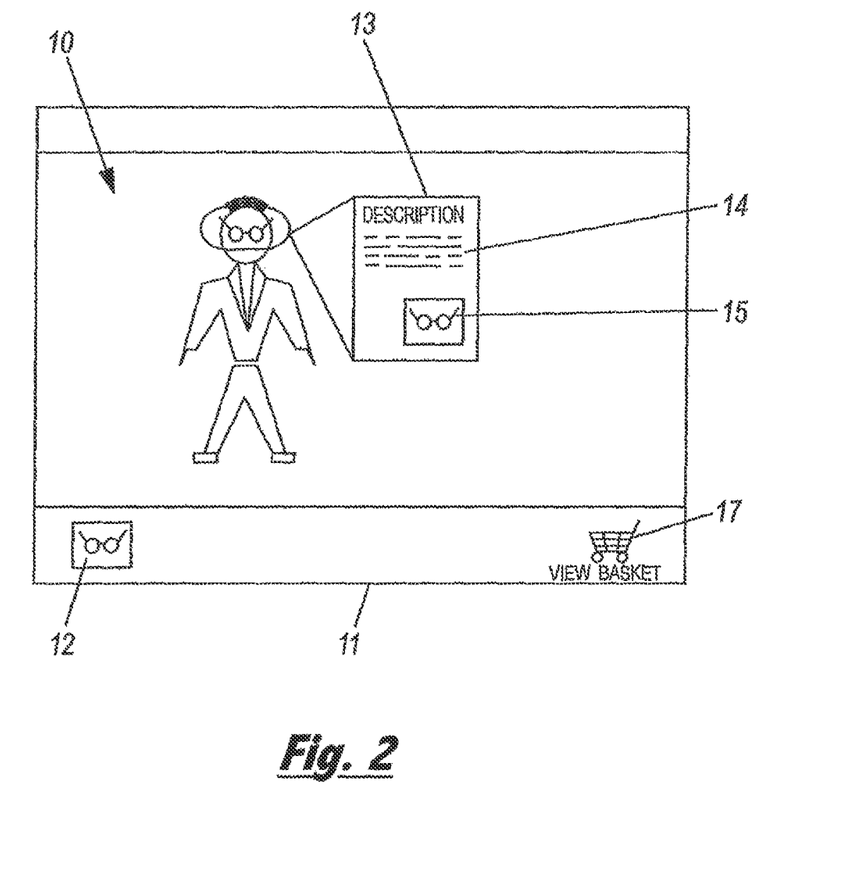
FIG. 2 illustrates the display of information about a featured product in an implementation of the present invention.

Upon selection, the image file is paused and, as is illustrated in FIG. 2, information relating to the product is displayed. The information may be displayed in a pop up window 13 provided over the paused image, as is shown in FIG. 2. Alternatively, the information may be displayed in an information bar alongside the paused image. The information may include a description of the qualities of the product 14, one or more images of the product 15, the name of the manufacturer and the price.

Figure 3:
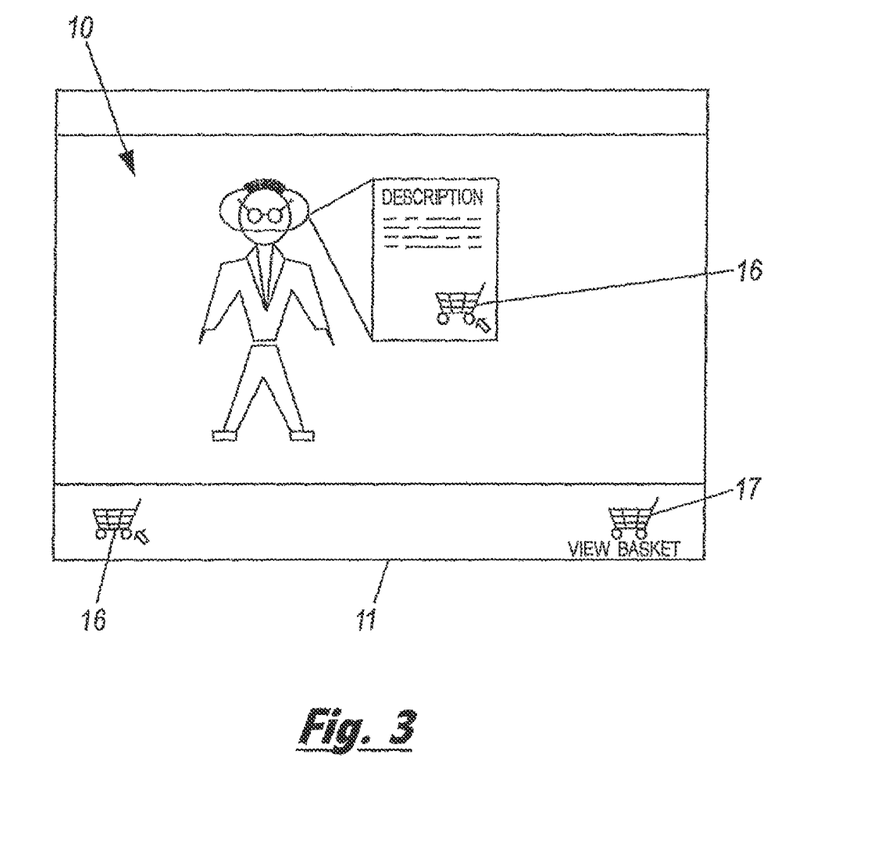
FIG. 3 illustrates the display after a product icon is scrolled over in an implementation of the present invention.

The displayed information also includes a selectable purchase icon 16, in this case, in the form of a shopping cart in the presently described implementation, the purchase icon 16 appears if the viewer scrolls over either the product icon 12 or the product image 15 or operates a dedicated control input. The viewer may then select the purchase icon using the control means in any suitable manner. By selecting this icon 16, the product is added to a customers shopping list. The viewer can review and edit their shopping list and proceed to purchase by selecting the shopping cart icon 17 displayed on the icon bar. Alternatively, the selection may be made by actuating a dedicated control input on the control means.

After adding the product to their shopping list, the viewer may choose to complete the purchase at this time or may choose to continue viewing the image file. Typically, this may be possible by selecting suitable onscreen icons or buttons or by operating a suitable input on the control means.

Figure 4:
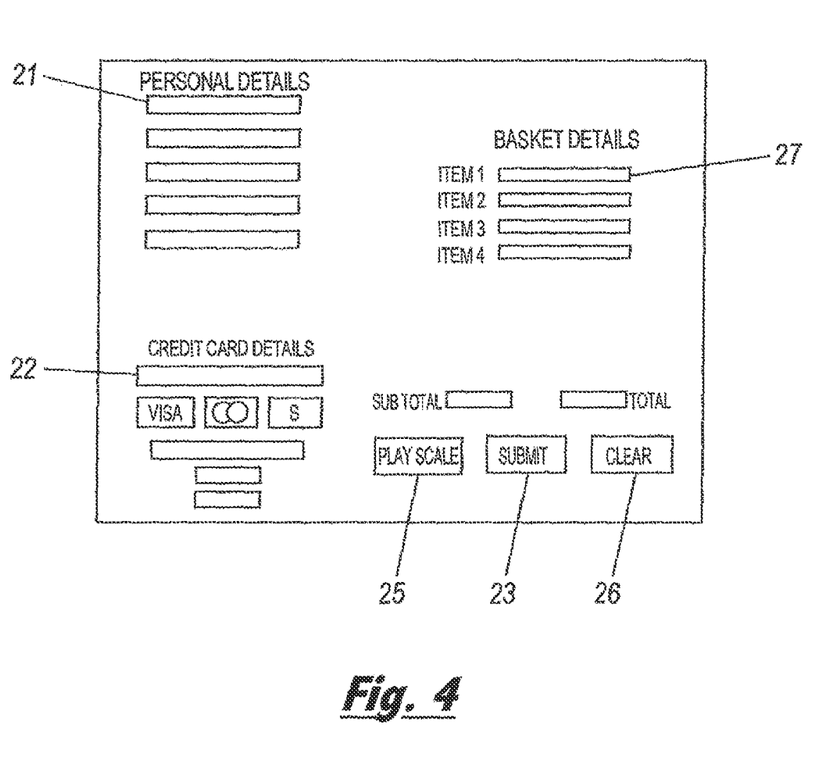
FIG. 4 illustrates an onscreen interface suitable for entering billing details in an implementation of the present invention.

When a viewer chooses to complete their purchase, either directly after adding a product to their shopping list or upon finishing viewing the file, the viewer is required to enter personnel details 21 and billing details 22, via a suitable on screen interface 20, which may be of the type shown in FIG. 4. In some implementations, the viewer may have saved such details or may opt to save such details and thus need not re-enter the details. The viewer may also view and/or edit the shopping list 27. Once the details are entered, the viewer can confirm the order by selection of an icon or button 23 provided or other suitable use of the control means. At any time, the viewer may clear entered data by selecting the icon or button 26 or continue viewing the image file by selecting the icon or button 25.

Figure 5:
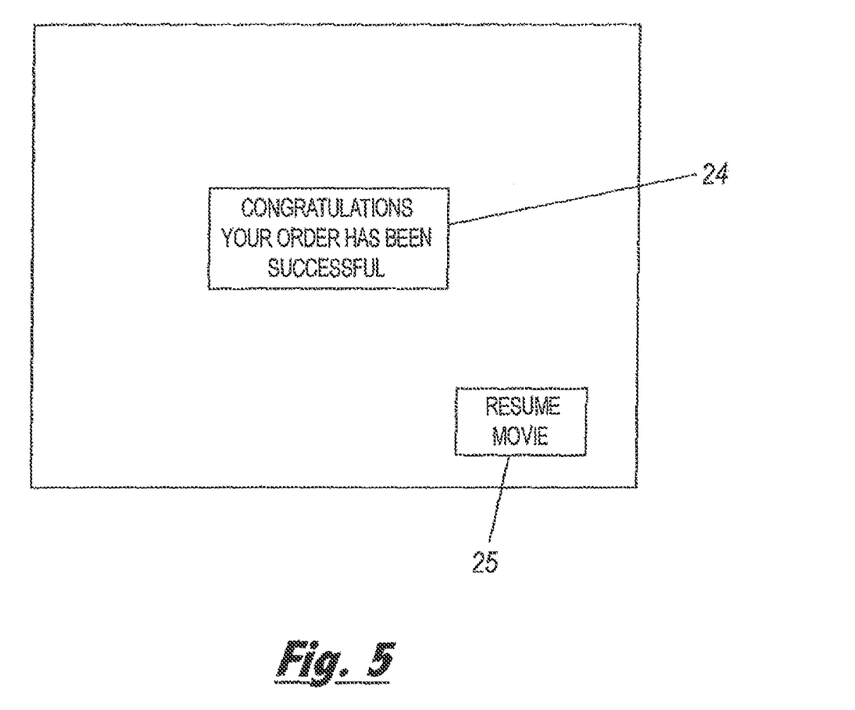
FIG. 5 illustrates the display after completion of an order in an implementation of the present invention.

After confirmation of the order by the viewer, it is transmitted to a remote server 30 operating the interface for checking. Assuming that the payment details are correct and the order can be fulfilled, a confirmation message 24 is displayed to the viewer and the viewer is presented with a button or icon 25 enabling the option of resuming viewing operation, as is shown in FIG. 5.

Figure 6:
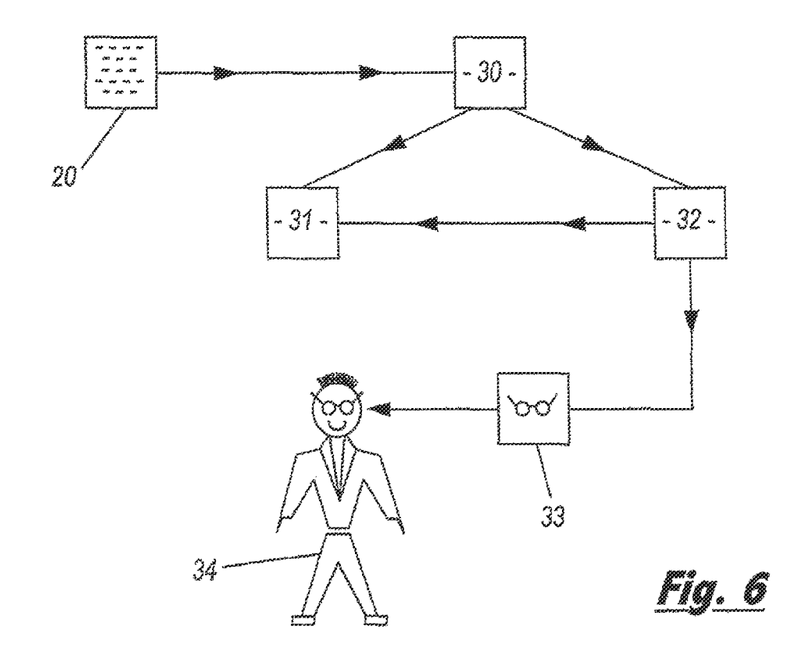
FIG. 6 is a schematic block diagram of a means by which a viewers order may be checked and fulfilled in an implementation of the present invention.

Turning now to FIG. 6, one possible implementation of the means for checking and fulfilling a viewer order is shown. Information from the viewers viewing apparatus is communicated to a server 30. The server 30 is operable to check the viewer's order and billing details. If these are valid, the confirmation message 24 is relayed to the viewer's viewing apparatus. Additionally, the server 30 is operable to communicate the requisite order details to the manufacturer 31 and/or distributor 32 for each of the ordered products. This allows the ordered products 33 to be delivered to the viewer 34 in due course.

This method has the advantage of satisfying viewer curiosity about products in films, computer games and/or television programs whilst further providing a simple way for the viewer to order any products with which they are impressed. This is much simpler for the viewer than researching the product and the manufacturer in order to place an order. Consequently, products featured in this manner might reasonably expect increased sales.

In order to implement the above method, it is necessary to provide modified moving image files. This may be achieved by adding addition data fields into the image file. The additional fields may contain the icons displayed, data indicating when and where a featured product is visible to the viewer and information relating to the featured product.

Figure 7:
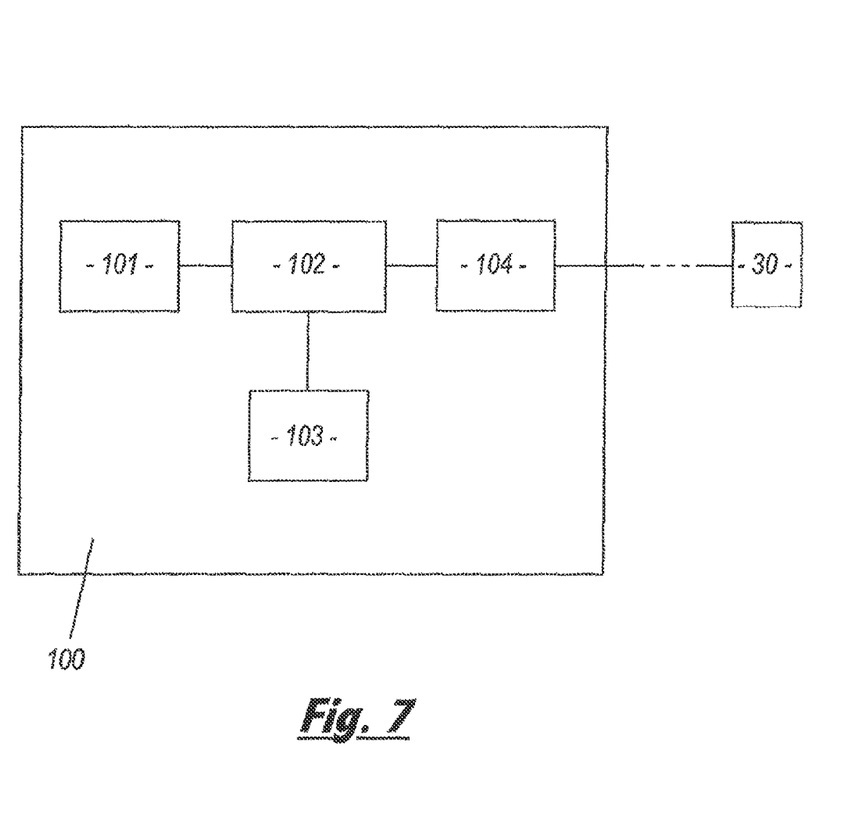
FIG. 7 is a schematic block diagram of a viewing apparatus or system suitable for facilitating the implementation of the present invention.

The invention may be implemented for the viewer via a single device or via a linked system of devices. In order to be suitable to operate the invention, the single device or system must provide the elements illustrated in FIG. 7. Herein, the system 100 comprises a display unit 101, an image file playing means 102, a viewer operable control means 103 and data exchange means 104 by means of which data may be exchanged with the server 30.

As an example, the system may comprise a computer system (a suitable example being the system sold by Dell under the model number Optiplex GX620) or may comprise a separate display unit and separate image file player (or of course an integrated display unit and player).

Figure 10:
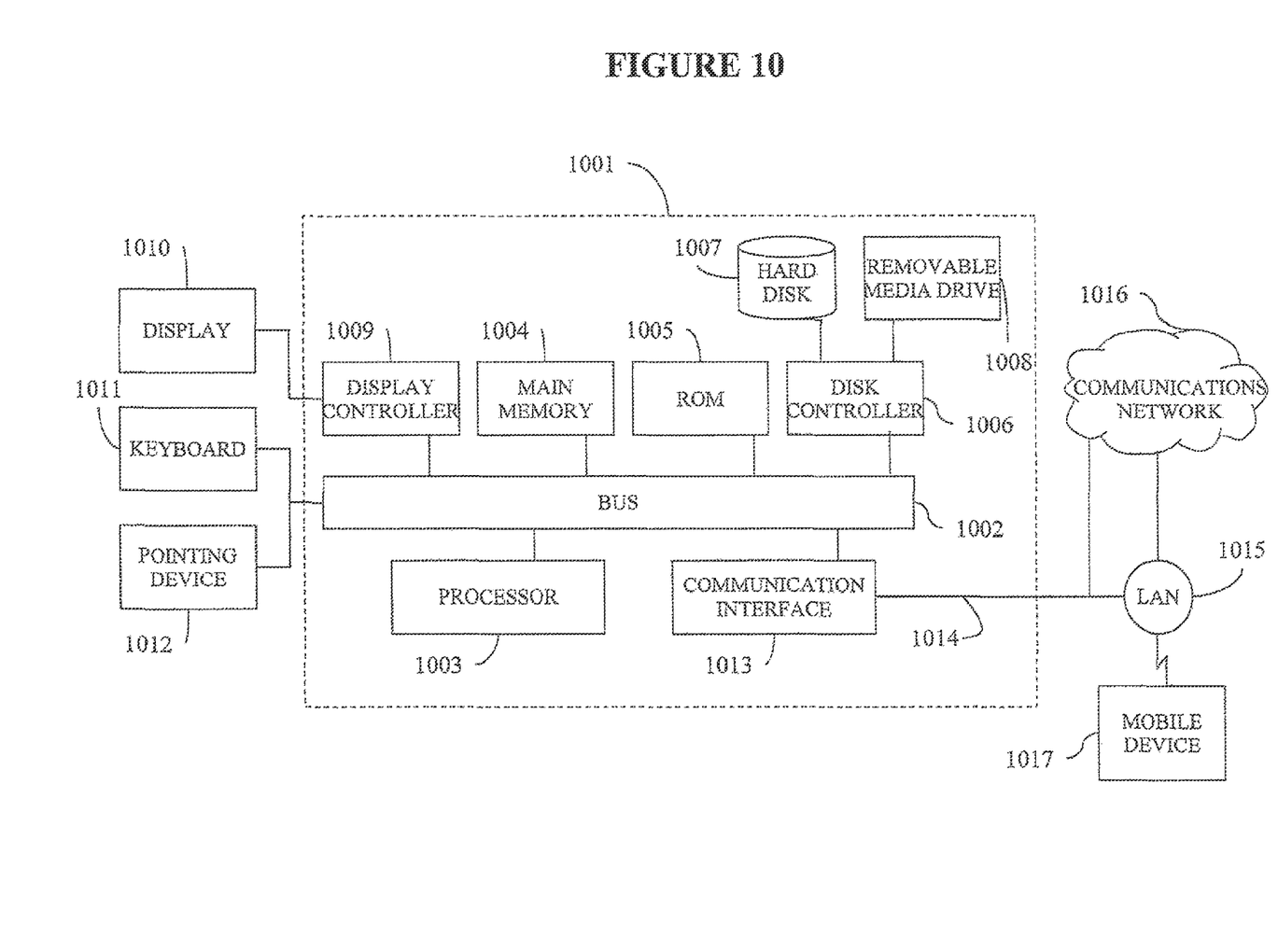
FIG. 10 is a schematic diagram of a computer system suitable for implementing the present invention.

The computer system may be a computer system 1001 of the type illustrated in FIG. 10 upon which an embodiment of the present invention ma be implemented. The computer system 1001 includes a bus 1002 or other communication mechanism for communicating information, and a processor 1003 coupled with the bus 1002 for processing, the information. The computer system 1001 also includes a main, memory 1004, such as a random access memory (RAM) or other dynamic storage device (e.g., dynamic RAM (DRAW static RAM (SRAM), and synchronous DRAM (SDRAM)), coupled to the bus 1002 for storing, information and instructions to be executed by processor 1003. In addition, the main memory 1004 may be used for storing temporary variables or other intermediate information during the execution of instructions by the processor 1003. The computer system 1001 further includes a read only memory (ROM) 1005 or other static storage device e.g., programmable ROM (PROM), erasable PROM (EPROM), and electrically erasable PROM (EEPROM)) coupled to the bus 1002 for storing static information and instructions for the processor 1003.

The computer system 1001 also includes a disk controller 1006 coupled to the bus 1002 to control one or more storage devices for storing information and instructions, such as a magnetic hard disk 1007, and a removable media drive 1008 (e.g., floppy disk drive, read-only compact disc drive, read/write compact disc drive, compact disc jukebox, tape drive, and removable magneto-optical drive). The storage devices may be added to the computer system 1001 using an appropriate device Interface (e.g., small computer system interface (SCSI), integrated device electronics (IDE), enhanced-IDE (E-IDE), direct memory access (DMA), or ultra-DMA).

The computer system 1001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1001 may also include a display controller 1009 coupled to the bus 1002 to control a display 1010, such as a cathode ray tube (CRT), for displaying information to a computer user. The computer system includes input devices, such as a keyboard 1011 and a pointing device 1012, for interacting with a computer user and providing information to the processor 1003. The pointing device 1012, for example, may be a mouse, a trackball, or a pointing stick for communicating direction information and command selections to the processor 1003 and for controlling cursor movement on the display 1010. In addition, a printer may provide printed listings of data stored and/or generated by the computer system 1001.

The computer system 1001 performs a portion or all of the processing steps of the invention in response to the processor 1003 executing one or more sequences of one or more instructions contained in a memory, such as the main memory 1004. Such instructions may be read into the main memory 1004 from another computer readable medium, such as a hard disk 1007 or a removable media drive 1008. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the computer system 1001 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM, DVD-ROM (including HD-DVD or Bin-ray DVD), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1001, for driving a device or devices for implementing the invention, and for enabling the computer system 1001 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1003 for execution. A computer readable medium may take many forms, including but not limited to non-volatile media, volatile media, and transmission media. Non-volatile medic includes, for example, optical, magnetic disks, and magneto-optical disks, such as the hard disk 1007 or the removable media drive 1008. Volatile media includes dynamic memory, such as the main memory 1004. Transmission media includes coaxial cables, copper wire and fiber optics, including the wires that make up the bus 1002. Transmission media also may also take the form of acoustic or light waves, such as those generated during radio wave and infrared data communications.

Various forms of computer readable media may be involved in carrying out one or more sequences of one or more instructions to processor 1003 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1001 may receive the data on the telephone line and use an infrared transmitter to convert the data to an infrared signal. An infrared detector coupled to the bus 1002 can receive the data carried in the infrared signal and place the data on the bus 1002. The bus 1002 carries the data to the main memory 1004, from which the processor 1003 retrieves and executes the instructions. The instructions received by the main memory 1004 may optionally be stored on storage device 1007 or 1008 either before or after execution by processor 1003.

The computer system 1001 also includes a communication interface 1013 coupled to the bus 1002. The communication interface 1013 provides a two-way data communication coupling to a network link 1014 that is connected to, for example, a local area network (LAN) 1015, or to another communications network 1016 such as the Internet or any broadcast signal such as a terrestrial or satellite television or radio network. For example, the communication interface 1013 may be a network interface card to attach to any packet switched LAN. As another example, the communication interface 1013 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1013 sends and receives electrical, electromagnetic or optical signals that carry digital data streams representing various types of information.

The network link 1014 typically provides data, communication through one or more networks to other data devices. For example, the network link 1014 may provide a connection to another computer through a local network 1015 (e.g., a LAN) or through equipment operated by a service provider, which provides communication services through a communications network 1016. The local network 1014 and the communications network 1016 use, for example, electrical, electromagnetic, or optical signals that carry digital data streams, and the associated physical layer (e.g., CAT 5 cable, coaxial cable, optical fiber, etc). The signals through the various networks and the signals on the network link 1014 and through the communication interface 1013, which carry the digital data to and from the computer system 1001 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1001 can transmit and receive data, including program code, through the network(s) 1015 and 1016, the network link 1014 and the communication interface 1013. Moreover, the network link 1014 may provide a connection through a LAN 1015 to a mobile device 1017 such as a personal digital assistant (PDA) laptop computer, or cellular telephone.

Figure 8:
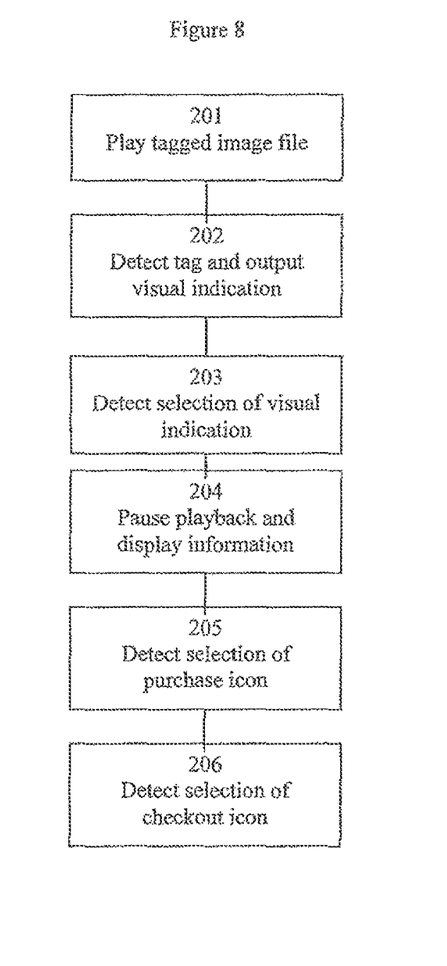
FIG. 8 is a flow diagram illustrating the operation of one embodiment of the present invention.

Turning now to FIG. 8, a flow chart illustrating the operation of another embodiment of the invention upon the computer system 1001 of FIG. 10. In this embodiment, a tagged moving image file is stored on hard disk 1007, removable media drive 1008 or is streamed from communications network 1016. In response to as suitable viewer instruction, the image content of the file is output on display 1010, at step 201.

If whilst playing a file the processor 1003 detects the existence of a tag, it signals the display controller 1009 to vary the output of display 1010 to provide a visual indication of the existence of a tag, at step 202. The visual indication may be a highlighted area over the associated item and/or an icon such as 12 in FIG. 1. The a highlighted area and/or icon 12 is displayed for as long as the tag indicates is necessary, typically until the end of the scene in which the associated item is visible.

At step 203, the processor 1003 monitors the pointing device 1012 and the keyboard 1011 to determine whether a viewer has selected the highlighted area and/or icon 12. If the processor 1003 determines that the highlighted area and/or icon 12 has been selected, the playing of the image file is paused and information is displayed in a pop up window 13, including product image 15, at step 204. If no selection is detected or if a selection is cancelled, the processor 1003 may revert back to step 201 and resume playing the image file. This step may also include monitoring whether the viewer scrolls over image 15 and, if so, displaying a purchase icon 16.

At step 205, the processor 1003 monitors the pointing device 1012 and the keyboard 1011 to determine whether a viewer has selected the purchase icon 16. If so, the associated product is added to a shopping list stored in main memory 1004. If no selection is detected or if a selection is cancelled, the processor 1003 may revert back to step 201 and resume playing the image file.

At step 206, the processor 1003 monitors the pointing device 1012 and the keyboard 1011 to determine whether a viewer has selected the checkout icon 17. If so, the processor activates an interface 20 which allows the viewer to enter the details required to complete the purchase. The processor can then communicate the necessary data to the remote server 30 of FIG. 6 via the communications network 1016 enabling the order to be fulfilled as described previously. If no selection is detected or if a selection is cancelled, the processor 1003 may revert back to step 201 and resume playing the image file.

In each of the above steps if no selection is detected or if a selection is cancelled, in alternative embodiments the processor 1003 may revert back to the previous step, if appropriate.

Figure 9:
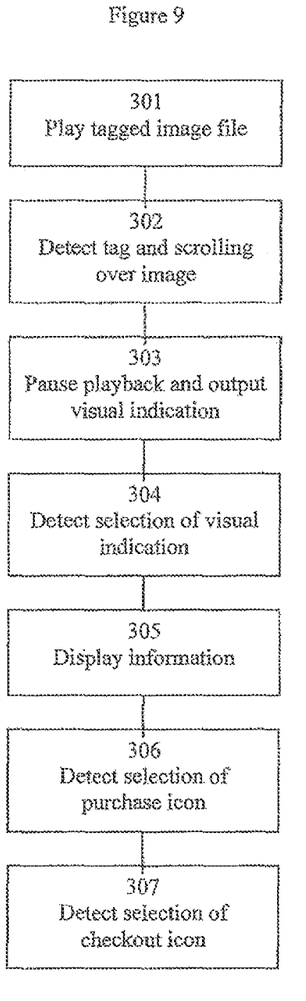
FIG. 9 is a flow diagram illustrating the operation of an alternative embodiment of the present invention.

Turning now to FIG. 9, a flow chart illustrating the operation of another embodiment of the invention upon the computer system 1001 of FIG. 10 is shown. As above, a tagged moving image file is stored on hard disk 1007, on removable media drive 1008 or is streamed from communications network 1016. In response to a suitable viewer instruction, the image content of the file is output on display 1010, at step 301.

At step 302, the processor 1003 monitors the image file to detect tags and monitors the pointing device 1012 to determine whether a viewer has scrolled over the portion of the display device 1010 showing the image file. If the processor 1003 determines that both have occurred, the playing of the image file is paused and the processor 1003 signals the display controller 1009 to vary the output of display 1010 to provide a visual indication of the existence of a tag, at step 303. The visual indication may be a highlighted area over the associated item and/or an icon such as 12 in FIG. 1.

At step 304, the processor 1003 monitors the pointing device 1012 and the keyboard 1011 to determine whether a viewer has selected the highlighted area and/or icon 12. If the processor 1003 determines that the highlighted area and/or icon 12 has been selected, associated information is displayed in a pop up window 13, including product image 15, at step 305, if no selection is detected or if a selection is cancelled, the processor 1003 may revert back to step 301 and resume playing the image file. This step may also include monitoring whether the viewer scrolls over image 15, 12 and, if so, displaying a purchase icon 16.

At step 306, the processor 1003 monitors the pointing device 1012 and the keyboard 1011 to determine whether a viewer has selected the purchase icon 16. If so, the associated product is added to a shopping list stored in main memory 1004. If no selection is detected or if a selection is cancelled, the processor 1003 may revert back to step 301 and resume playing the image file.

At step 307, the processor 1003 monitors the pointing device 1012 and the keyboard 1011 to determine whether a viewer has selected the checkout icon 17. If so, the processor activates an interface 20 which allows the viewer to enter the details required to complete the purchase. The processor can then communicate the necessary data to the remote server 30 of FIG. 6 via the communications network 1016 enabling the order to be fulfilled as described previously. If no selection is detected or if a selection is cancelled, the processor 1003 may revert back to step 301 and resume playing the image file.

In each of the above steps if no selection, is detected or if a selection is cancelled, in alternative embodiments the processor 1003 may revert back to the previous step, if appropriate.

The above method can of course be implemented on other suitably adapted devices. For instance, the display unit may be a viewer's television (or other display unit) and the player may be any suitable player including but not limited, to the television itself, a games console, a media player such as a DVD player or similar, or a satellite or cable television decoder box. A further possibility is that the invention may be implemented through a mobile technology device including but not limited to phones, portable media players, PDAs or similar. In such examples, the control means may be a suitably adapted remote control Means.

In particular, the control means might be an integrated or connected (via wired or wireless link) keyboard or keypad, an integrated or connected (via wired or wireless link) pointer device or a touch sensitive screen.

The present invention is implemented using a suitable adapted display device operable to read and display a moving image file. In this description, display device encompasses both a device having an integrated file reader and display unit and a combination of separate file readers and display units.

In one particular embodiment, the invention may be implemented on a media player with as remote control unit adapted to have a 'hot button'. The hot button may be a dedicated viewer actuable input which automatically selects a tagged product in the currently viewed scene or cycles through two or more tagged products in a viewed scene. An additional hot button may be provided to enable the viewer to complete a purchase.

It is of course to be understood that the invention is not to be restricted to the details of the above embodiment which is described by way of example only.

What is claimed is:

1. A method of providing additional information to a viewer of a moving image file comprising the steps of:
   providing one or more tags within the moving image file indicating the existence of additional product information;
   visually indicating the existence of said tags alongside or over the moving image;
   detecting a request to view said product information associated with said one or more tags;
   pausing said moving image in response to the request to view said product information;
   displaying said requested product information in a window or dialogue box provided over said paused image and wherein the visual indication of the existence of a tag takes place in response to viewer action;
   wherein the displayed information relates to a particular product or products displayed on screen and wherein the displayed information includes a selectable purchase icon.

2. The method as claimed in claim 1 wherein the viewer action is selection of a tag visual indication display mode which toggles between enabled and not enabled or is enabled temporarily in response to viewer selection or request.

3. The method as claimed in claim 1 wherein tag visual indication is in response to viewer selection of a particular area of the displayed image.

4. The method as claimed in claim 1 wherein the visual indication of the existence of a tag comprises the display of a product icon either over the tagged product or in an icon display area, the icon display area being a bar provided along one edge of the display area.

5. The method as claimed in claim 1 wherein the tagged product is momentarily, intermittently or constantly visually highlighted within the image.

6. The method as claimed in claim 1 wherein the displayed information contains any of the following: a description of the qualities of the product, one or more images of the product, the name of the manufacturer and purchasing details for the product.

7. The method as claimed in claim 1 wherein the displayed information relates to a particular product or products displayed on screen and wherein the displayed information includes a selectable purchase icon, selection of which enables the connection of the viewer to an electronic commerce interface for the purchase of said product.

8. The method as claimed in claim 7 wherein the selectable purchase icon is revealed by scrolling over one or more regions of the image or wherein the selectable purchase icon is revealed by scrolling over a product icon in the dialog box or along the icon display area.

9. The method as claimed in claim 7 wherein selection of the purchase icon connects the viewer directly to said commerce interface or wherein selection of the purchase icon results in the addition of the product to a shopping list after which, the viewer may opt either to continue viewing the image file or to complete the purchasing process.

10. The method as claimed in claim 7 wherein the viewer may opt to complete the purchasing process at any time by selecting a displayed checkout icon or by actuation of a particular control button on the control means.

11. The method as claimed in claim 10 wherein selection of the checkout icon allows the viewer to review their shopping list before completing the purchase process.

12. The method as claimed in claim 10 wherein the commerce interface is an electronic commerce interface operable in response to input of viewer and product details to verify an order and subsequently pass on order details to a manufacturer or distributor enabling the order to be fulfilled.

13. The method as claimed in claim 7 wherein the commerce interface is operated on a remote server and wherein once connected to the commerce interface, the viewer must enter and/or confirm their billing and/or delivery details and upon confirmation from the viewer of the billing and/or delivery details, the interface is operable to verify the order.

14. A system for providing additional information to viewers of a moving image file comprising:
   file reading means for reading the moving image content of said moving image file and detecting the presence of one or more tags indicating the existence of associated product information within the moving image file;
   display means operable to display the moving image content of the moving image file and to display a visual indication of the existence of said tags alongside or over the moving image;
   viewer actuable means for requesting the display of product information associated with said one or more tags wherein in response to the viewer actuable means the display means is operable to pause the moving image and display the requested information in a window or dialogue box provided over the paused image and wherein the visual indication of the existence of a tag takes place in response to the viewer actuable means, wherein the displayed information relates to a particular product or products displayed on screen and wherein the displayed information includes a selectable purchase icon.

15. The system as claimed in claim 14 wherein the viewer actuable means are control means of the type including any of: control interfaces provided directly upon the system, keyboards or keypads connected to the system by any suitable wired or wireless link, cursor directing devices connected to the system by any suitable wired or wireless link.

16. The system as claimed in claim 14 wherein the system comprises any of a computer, a mobile technology device, a television or a television operated in conjunction with a media player such as a DVD player, games console or television signal decoder.

17. The system for providing additional information to viewers of a moving image file according to claim 14, the system further comprising: viewer operated control means for selecting said selectable purchase icon; and data transmission means operable to in response to the selection of said selectable purchase icon to enable connection of the system to an electronic 15 commerce interface, for the purchase of said product.

\* \* \* \* \*